(12) United States Patent
Büttner et al.

(10) Patent No.: US 12,069,155 B2
(45) Date of Patent: Aug. 20, 2024

(54) METHOD FOR SYNCHRONIZING TIME IN AN ETHERNET-BASED NETWORK

(71) Applicant: Beckhoff Automation GmbH, Verl (DE)

(72) Inventors: Holger Büttner, Berlin (DE); Dirk Janssen, Verl (DE); Erik Vonnahme, Salzkotten (DE); Hans Beckhoff, Verl (DE); Thomas Rettig, Rheda-Wiedenbrück (DE); Thorsten Bunte, Gütersloh (DE); Johannes Beckhoff, Schloß Holte-Stukenbrock (DE); Guido Beckmann, Verl (DE); Karl Weber, Altdorf (DE)

(73) Assignee: Beckhoff Automation GmbH, Verl (DE)

( * ) Notice: Subject to any disclaimer, the term of this patent is extended or adjusted under 35 U.S.C. 154(b) by 462 days.

(21) Appl. No.: 17/549,819

(22) Filed: Dec. 13, 2021

(65) Prior Publication Data
US 2022/0103337 A1 Mar. 31, 2022

Related U.S. Application Data

(63) Continuation of application No. PCT/EP2020/074699, filed on Sep. 4, 2020.

(30) Foreign Application Priority Data

Sep. 23, 2019 (DE) ...................... 10 2019 125 527.9

(51) Int. Cl.
*H04L 7/04* (2006.01)
*H04L 12/40* (2006.01)

(52) U.S. Cl.
CPC ................ *H04L 7/04* (2013.01); *H04L 12/40* (2013.01); *H04L 2012/4026* (2013.01)

(58) Field of Classification Search
CPC ........................................................ H04L 7/04
See application file for complete search history.

(56) References Cited

U.S. PATENT DOCUMENTS

| 8,179,923 B2 | 5/2012 | Krause |
| 8,464,056 B2 | 6/2013 | Poledna |

(Continued)

FOREIGN PATENT DOCUMENTS

| CN | 110168971 A | 8/2019 |
| DE | 10018136 A1 | 10/2001 |

(Continued)

OTHER PUBLICATIONS

International Search Report and Written Opinion dated Jan. 19, 2021 in connection with International Patent Application No. PCT/EP2020/074699, 28 pages including English translation.

(Continued)

*Primary Examiner* — Abdeltif Ajid
(74) *Attorney, Agent, or Firm* — Dorsey & Whitney LLP (57) ABSTRACT

A method for synchronizing time in an Ethernet-based network having a master network subscriber, a first segment and a second segment. Each segment has at least one network subscriber. The second segment is connected to the first segment by a first network distributor, arranged in the second segment. The method comprises steps for sending out a synchronization telegram addressed to the second segment by the master network subscriber, the synchronization telegram being of the first type; receiving the synchronization telegram by the first network distributor, for conversion into a second type; forwarding the synchronization telegram to a network distributor of the second segment, by the first network distributor; reading out a synchronization value stored in the synchronization telegram by the first network distributor of the second segment; and adjusting a (Continued)

speed of a local system time of the network distributor of the second segment, using the synchronization value.

13 Claims, 4 Drawing Sheets

(56) References Cited

U.S. PATENT DOCUMENTS

| | | | |
|---|---|---|---|
| 9,100,209 B2 | 8/2015 | Steindl | |
| 10,873,536 B2 | 12/2020 | Bunte et al. | |
| 11,050,585 B2 | 6/2021 | Bunte et al. | |
| 11,398,919 B2* | 7/2022 | Janssen | H04L 12/40169 |
| 2002/0015407 A1 | 2/2002 | Huebsch et al. | |
| 2002/0110155 A1 | 8/2002 | Pearce et al. | |
| 2005/0058149 A1 | 3/2005 | Howe | |
| 2006/0109866 A1 | 5/2006 | Janssen et al. | |
| 2010/0054274 A1 | 3/2010 | Breyer et al. | |
| 2011/0016362 A1* | 1/2011 | Holzaepfel | H04L 43/50 714/51 |
| 2013/0124763 A1 | 5/2013 | Kessler | |
| 2015/0365252 A1* | 12/2015 | Bunte | H04L 12/6418 709/208 |
| 2016/0127067 A1* | 5/2016 | Bunte | H04L 12/6418 370/503 |
| 2018/0013508 A1 | 1/2018 | Rabinovich et al. | |
| 2018/0167900 A1 | 6/2018 | Wang et al. | |
| 2019/0363815 A1 | 11/2019 | Bogenberger et al. | |
| 2020/0244480 A1* | 7/2020 | Bunte | H04L 12/40163 |
| 2021/0359877 A1* | 11/2021 | Janssen | H04L 12/462 |

FOREIGN PATENT DOCUMENTS

| | | |
|---|---|---|
| DE | 102014112082 A1 | 2/2016 |
| DE | 102017210895 A1 | 1/2019 |
| DE | 102017125086 A1 | 5/2019 |
| EP | 2501079 A1 | 9/2012 |
| WO | 2008101394 A1 | 8/2008 |
| WO | 2009121087 A1 | 10/2009 |

OTHER PUBLICATIONS

International Preliminary Report on Patentability dated Jul. 9, 2021 in connection with International Patent Application No. PCT/EP2020/074699, 31 pages including English translation.

Examination Report dated Jul. 29, 2020 in connection with German patent application No. 10 2019 125 527.9, 14 pages including English translation.

First Office Action dated Jun. 28, 2022 received in connection with Chinese patent application No. 202080048472.8, 9 pages including English translation.

"EtherCAT—the Ethernet Fieldbus," EtherCAT Technology Group, Nov. 2012, 21 pages.

* cited by examiner

METHOD FOR SYNCHRONIZING TIME IN AN ETHERNET-BASED NETWORK

CROSS-REFERENCE TO RELATED APPLICATIONS

This application is a continuation of International Patent Application No. PCT/EP2020/074699, filed Sep. 4, 2020, entitled METHOD FOR TIME SYNCHRONIZATION IN AN ETHERNET-BASED NETWORK, which claims priority to German priority application DE 10 2019 125 527.9, filed Sep. 23, 2019, entitled VERFAHREN ZUR ZEITSYNCHRONISATION IN EINEM ETHERNET-BASIERTEN NETZWERK, each of which is incorporated by reference herein, in the entirety and for all purposes.

FIELD

The present invention relates to a method for synchronizing time in an Ethernet-based network.

BACKGROUND

Data networks are known from the prior art. Prior art wired data networks are frequently based on the Ethernet standard. Under the generic term "Industrial Ethernet", it is known in the prior art to use Ethernet data networks for networking devices in industrial manufacturing and automation technology. Such data networks may e.g. be based on the EtherCAT standard. Such data networks may also be referred to as a field bus.

For specific control tasks, it is necessary that all devices involved in this control task and networked via a field bus use the same clock time. For example, it may be required that the clock times of the individual devices should not differ by more than 1 µs. To ensure this, it is known to perform cyclic time synchronization on field buses.

DE 10 2017 125 086 A1 describes a communication network with a master subscriber and at least one slave subscriber. Data are exchanged between the master subscriber and the slave subscriber in the form of telegrams. The telegrams to be sent to the master subscriber by the slave subscriber are each assigned control data that contain forwarding time information as to when the corresponding telegram is to be output in the direction of a first network segment with the master subscriber, the forwarding time information being specified by the master subscriber.

US 2018/0013508 A1 describes a method for operating a timer in a network. The method comprises steps of transmitting a time signal by the timer, receiving a time signal by the timer, and obtaining phase and frequency information from the time signals.

SUMMARY

The present invention provides a method for synchronizing time in an Ethernet-based network.

EXAMPLES

According to one aspect of the invention, a method for synchronizing time in an Ethernet-based network comprises a master network subscriber, a first segment and a second segment, where each segment comprises at least one network subscriber, and where the second segment is connected to the first segment by a first network distributor arranged in the first segment. The method comprises steps for sending out a synchronization telegram addressed to the second segment by the master network subscriber, the synchronization telegram being of the first type; for receiving the synchronization telegram by the first network distributor; for converting the synchronization telegram into a second type, by the first network distributor; for forwarding the synchronization telegram to a network subscriber of the second segment, by the first network distributor; for reading out a synchronization value stored in the synchronization telegram, by the network subscriber of the second segment; and for adjusting a speed of a local system time of the network subscribers of the second segment, using the synchronization value.

BRIEF DESCRIPTION OF THE DRAWINGS

In the following, the present invention is described in more detail with reference to the figures, in which.

DETAILED DESCRIPTION

Figure 1:
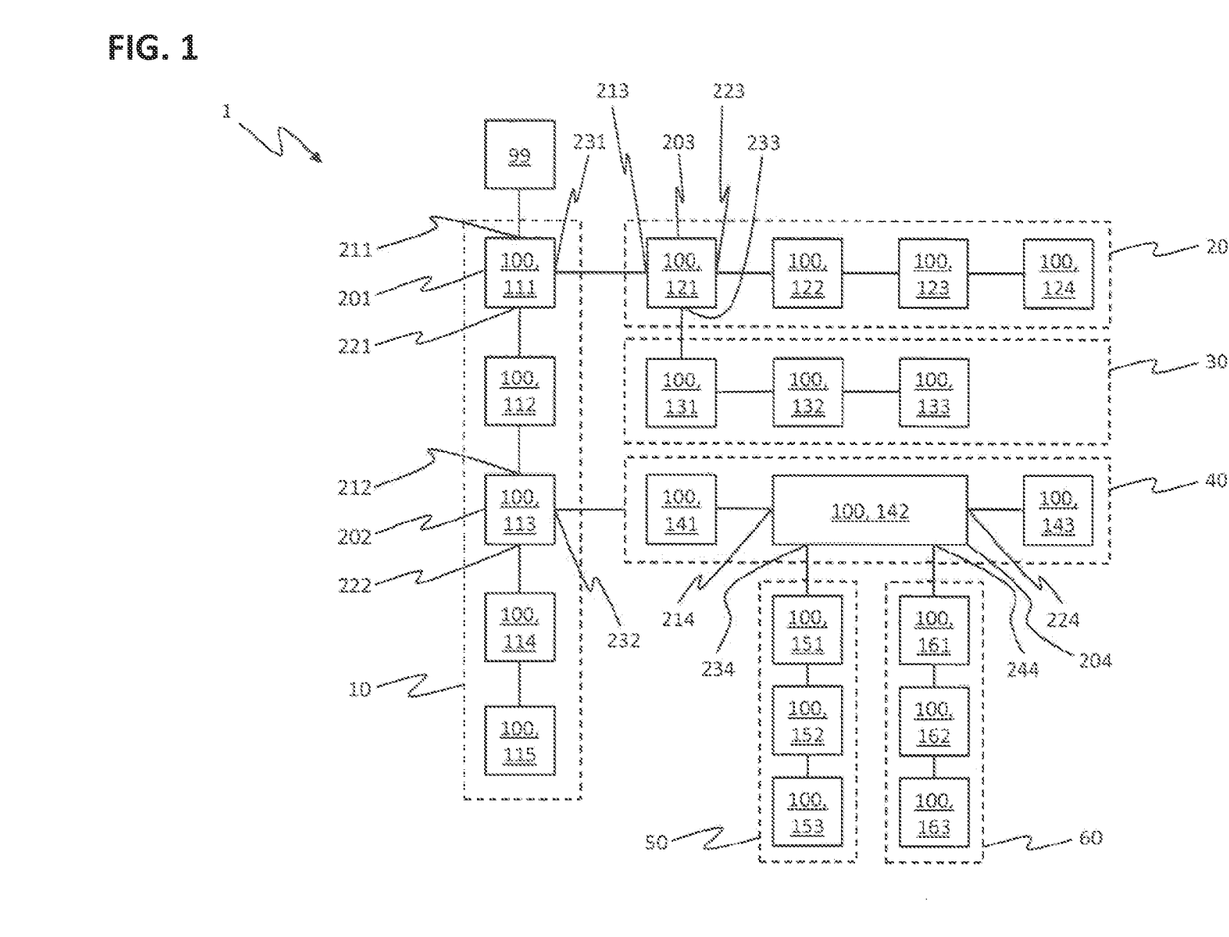
FIG. 1 shows a schematic depiction of a network having a plurality of segments, each with multiple network subscribers.

FIG. 1 shows a schematic diagram of an exemplary network 1. The network 1 is an Ethernet-based network and may e.g. be used for control and automation purposes. The network 1 may also be referred to as a field bus. The network 1 may e.g. be an EtherCAT network.

The network 1 is divided up into several segments. In the shown example, the network 1 comprises a first segment 10, a second segment 20, a third segment 30, a fourth segment 40, a fifth segment 50, and a sixth segment 60. Each of these segments 10, 20, 30, 40, 50, 60 comprises one or a plurality of network subscribers 100. The network subscribers 100 may also be referred to as slave network subscribers.

The network subscribers 100 of the different segments 10, 20, 30, 40, 50, 60 may communicate with one another at different transmission rates. For example, the network subscribers 100 of the second segment 20 may communicate with one another at a transmission rate of 1 GBaud and the network subscribers 100 of the third segment 30 at a transmission rate of 100 MBaud. Other transmission rates are also possible. Of course, all network subscribers 100 of all segments 10, 20, 30, 40, 50, 60 may also communicate with one another at the same transmission rate.

In the example shown in FIG. 1, the first segment 10 comprises a first network subscriber 100, 111, a second network subscriber 100, 112, a third network subscriber 100, 113, a fourth network subscriber 100, 114, and a fifth network subscriber 100, 115. The second segment 20 comprises a first network subscriber 100, 121, a second network subscriber 100, 122, a third network subscriber 100, 123, and a fourth network subscriber 100, 124. The third segment 30 comprises a first network subscriber 100, 131, a second network subscriber 100, 132, and a third network subscriber 100, 133. The fourth segment 40 comprises a first network subscriber 100, 141, a second network subscriber 100, 142, and a third network subscriber 100, 143. The fifth segment 50 comprises a first network subscriber 100, 151, a second network subscriber 100, 152, and a third network subscriber 100, 153. The sixth segment 60 comprises a first network subscriber 100, 161, a second network subscriber 100, 162, and a third network subscriber 100, 163.

The first network subscriber 100, 111 of the first segment 10 is embodied as a first network distributor 201 and connects the second segment 20 to the first segment 10 of the network 1. For this purpose, the first network distributor 201 has a first connection 211, a second connection 221 and a third connection 231. The connections 211, 221, 231 of the first network distributor 201 may also be referred to as ports and are each formed as combined data inputs and data outputs. The second port 221 connects the first network subscriber 100, 111 of the first segment 10 embodied as the first network distributor 201 to the second network subscriber 100, 112 of the first segment 10. The third port 231 connects the first network distributor 201 to the first network subscriber 100, 121 of the second segment 20.

The third network subscriber 100, 113 of the first segment 10 is embodied as a second network distributor 202. The second network distributor 202 comprises a first port 212, a second port 222 and a third port 232. The ports 212, 222, 232 of the second network distributor 202 are formed analogously to the ports 211, 221, 231 of the first network distributor 201. The first port 212 of the second network distributor 202 connects the second network distributor 202 to the second network subscriber 100, 112 of the first segment 10. The second port 222 of the second network distributor 202 connects the second network distributor 202 to the fourth network subscriber 100, 114 of the first segment 10. The third port 232 connects the second network distributor 202 to the first network subscriber 100, 141 of the fourth segment 40. Thus, the second network distributor 202 connects the fourth segment 40 of the network 1 to the first segment 10.

The first network subscriber 100, 121 of the second segment 20 is embodied as a third network distributor 203. The third network distributor 203 comprises a first port 213, a second port 223 and a third port 233. The ports 213, 223, 233 of the third network distributor 203 are embodied analogously to the ports 211, 221, 231 of the first network distributor 201. The first port 213 of the third network distributor 203 is connected to the third port 231 of the first network distributor 201, thereby establishing the connection between the second segment 20 and the first segment 10. The second port 223 of the third network distributor 203 is connected to the second network subscriber 100, 122 of the second segment 20. The third port 233 of the third network distributor 203 is connected to the first network subscriber 100, 131 of the third segment 30. Thus, the third network distributor 203 connects the third segment 30 of the network 1 to the second segment 20.

The second network subscriber 100, 142 of the fourth segment 40 is embodied as a fourth network distributor 204. The fourth network distributor 204 comprises a first port 214, a second port 224, a third port 234, and a fourth port 244. The ports 214, 224, 234, 244 of the fourth network distributor 204 are embodied similarly to the ports 211, 221, 231 of the first network distributor 201. The first port 214 of the fourth network distributor 204 is connected to the first network subscriber 100, 141 of the fourth segment 40. The second port 224 of the fourth network distributor 204 is connected to the third network subscriber 100, 143 of the fourth segment 40. The third port 234 of the fourth network distributor 204 is connected to the first network subscriber 100, 151 of the fifth segment 50. As a result, the fourth network distributor 204 connects the fifth segment 50 of the network 1 to the fourth segment 40. The fourth port 244 of the fourth network distributor 204 is connected to the first network subscriber 100, 161 of the sixth segment 60. Thus, the fourth network distributor 204 also connects the sixth segment 60 to the fourth segment 40 of the network 1.

Thus, the network 1 exemplarily shown in FIG. 1 has a structure in which the second segment 20 and the fourth segment 40 are coupled to the first segment 10 and are thus arranged downstream of the first segment 10. The third segment 30 is coupled to the second segment 20 and is thus arranged downstream of the second segment 20. The fifth segment 50 and the sixth segment 60 are coupled to the fourth segment 40 and are thus arranged downstream of the fourth segment 40.

In addition to the network subscribers 100 arranged in the segments 10, 20, 30, 40, 50, 60, the network 1 comprises a master network subscriber 99. The master network subscriber 99 is connected to the first port 211 of the first network subscriber 100, 111 of the first segment 10 embodied as a first network distributor 201. The master network subscriber 99 performs a line function in the network 1. For this purpose, the master network subscriber 99 may e.g. send out data telegrams to the network subscribers 100 of the network 1.

Figure 2:
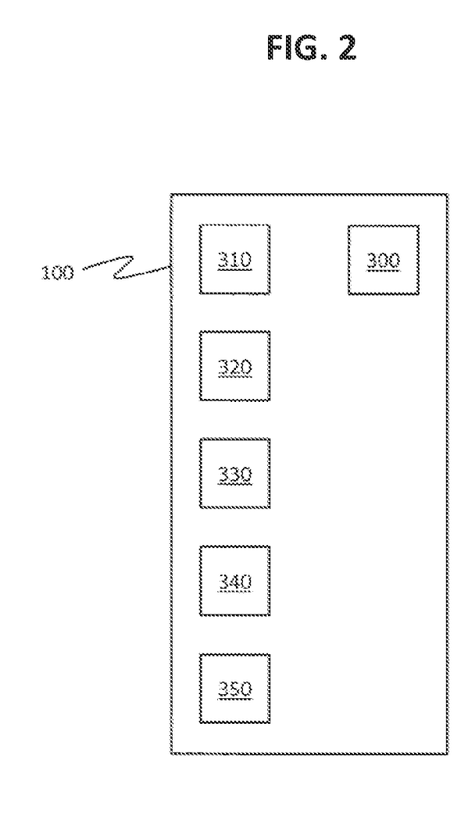
FIG. 2 shows a schematic depiction of a network subscriber of the network.

FIG. 2 shows a schematic depiction of one of the network subscribers 100 of the network 1. All network subscribers 100 of the network 1 at least comprise the components shown in FIG. 2.

The network subscriber 100 comprises an internal timer 300. The internal timer 300 may e.g. comprise an oscillating crystal. With the internal timer 300, a local time 310 of the network subscriber 100 is incremented. For example, the local time 310 may indicate the time that has elapsed since the network subscriber 100 was powered on. For example, the local time 310 may indicate this amount of time in nanoseconds. The speed at which the local time 310 is incremented based on the internal timer 300 may be adjusted to correct for the local time 310 advancing too quickly or too slowly.

The respective local time 310 of the network subscribers 100 usually differs among the individual network subscribers 100 of the network 1. When operating the network 1, however, it is desirable that all network subscribers 100 of the network 1 may use a common time base in order to synchronize the individual network subscribers 100 with one another and to be able to assign actions and events to unique points in time. For this purpose, a system time is specified in the network 1. The system time may also be referred to as a reference time or master time. For example, the system time may indicate the time that has elapsed since 1 Jan. 2000, 00:00 in nanoseconds. A time difference 320 is stored in each network subscriber 100, indicating a difference between the respective local time 310 of the network subscriber 100 and the system time. This time difference 320 is determined during an initialization phase of the network 1 for each network subscriber 100 of the network 1, by the master network subscriber 99, and is stored in the respective network subscriber 100. The time difference 320 stored in the network subscriber 100 enables each network subscriber 100 to calculate a local copy of the system time of the network 1 as the local system time 340 by adding the local time 310 and the time difference 320.

Since each network subscriber 100 of the network 1 has its own internal timer 300, and since these internal timers 300 differ from one another, the local time 310 may progress at slightly different speeds for each network subscriber 100 of the network 1. As a result, the progress speed of the local time 310 and thus the progress speed of the local system time 340 also differs from the progress speed of the system time of the network 1. This results in a creeping deviation or drift that must be compensated for by cyclic synchronization of the individual network subscribers 100 of the network 1. During this cyclic synchronization of the network subscribers 100, the speed of the local system time 340, i.e., the progress speed of the local system time 340, is adjusted in each network subscriber 100.

For time synchronization of the network subscribers 100 of network 1, the master network subscriber 99 of network 1 sends out synchronization telegrams segment by segment, by which the network subscribers 100 of a segment 10, 20, 30, 40, 50, 60 are each informed of a current value of the system time by a reference timer as a synchronization value. The network subscribers 100 compare this synchronization value with their own respective local system time 340 and adjust the progress speed of the respective local system time 340 (i.e., the progress speed of the respective local system time 340) accordingly. If the obtained synchronization value is larger than the local system time 340, the progress speed of the local system time 340 must be increased. If the synchronization value is smaller than the local system time 340, the speed of progress of the local system time 340 of the respective network subscriber 100 must be reduced.

When comparing the synchronization values obtained with the synchronization telegrams to the respective local system time 340, the network subscribers 100 of the network 1 each take into account a delay time 330 stored in the respective network subscriber 100, which specifies the time required for the synchronization telegram to reach the respective network subscriber 100 from the reference timer. Said delay time 330 is determined by the master network subscriber 99 during an initialization phase of the network 1 for each network subscriber 100 of the network 1 and stored in the respective network subscriber 100.

Figure 3:
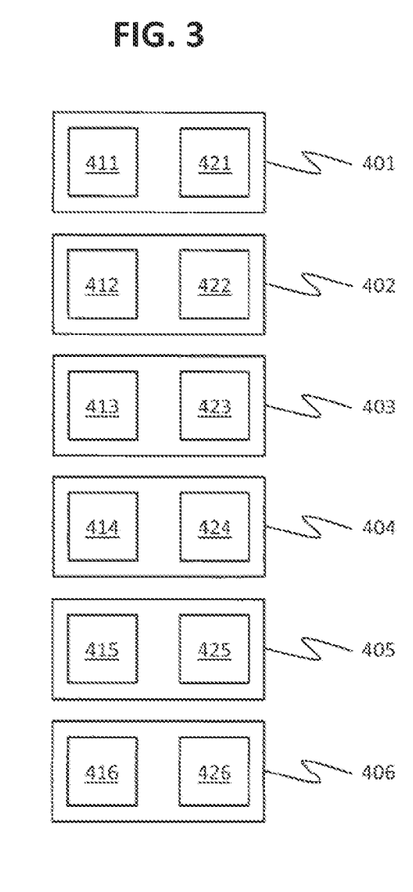
FIG. 3 is a schematic depiction of six synchronization telegrams.

Time synchronization is performed segment by segment, for example successively for the first segment 10, the second segment 20, the third segment 30, the fourth segment 40, the fifth segment 50 and the sixth segment 60 of network 1. In each case, all network subscribers 100 of a segment 10, 20, 30, 40, 50, 60 are synchronized together with a synchronization telegram. FIG. 3 schematically shows a first synchronization telegram 401, a second synchronization telegram 402, a third synchronization telegram 403, a fourth synchronization telegram 404, a fifth synchronization telegram 405 and a sixth synchronization telegram 406. With the first synchronization telegram 401, the network subscribers 100 of the first segment 10 are synchronized. With the second synchronization telegram 402, the network subscribers 100 of the second segment 20 are synchronized. With the third synchronization telegram 403, the network subscribers 100 of the third segment 30 are synchronized. With the fourth synchronization telegram 404, the network subscribers 100 of the fourth segment 40 are synchronized. With the fifth synchronization telegram 405, the network subscribers 100 of the fifth segment 50 are synchronized. With the sixth synchronization telegram 406, the network subscribers 100 of the sixth segment 60 are synchronized.

Each synchronization telegram 401, 402, 403, 404, 405, 406 has a type field. The first synchronization telegram 401 has a first type field 421. The second synchronization telegram 402 has a second type field 422. The third synchronization telegram 403 has a third type field 423. The fourth synchronization telegram 404 has a fourth type field 424. The fifth synchronization telegram 405 has a fifth type field 425. The sixth synchronization telegram 406 has a sixth type field 426. The type fields 421, 422, 423, 424, 425, 426 may each assume different values to define a type of the respective synchronization telegram 401, 402, 403, 404, 405, 406. If the respective type field 421, 422, 423, 424, 425, 426 has a first value, the respective synchronization telegram 401, 402, 403, 404, 405, 406 has a first type. If the respective type field 421, 422, 423, 424, 425, 426 has a second value, the respective synchronization telegram 401, 402, 403, 404, 405, 406 has a second type. Each of the synchronization telegrams 401, 402, 403, 404, 405, 406 may be converted from the first type to the second type by replacing the first value of the respective type field 421, 422, 423, 424, 425, 426 with the second value.

The type field 421, 422, 423, 424, 425, 426 allows for the fact that not all network subscribers 100 of the network 1 take all synchronization telegrams 401, 402, 403, 404, 405, 406 into account. For example, the network subscribers 100 may be to not take the synchronization telegrams 401, 402, 403, 404, 405, 406 into account if they are of the first type. Synchronization telegrams 401, 402, 403, 404, 405, 406 having the second type, on the other hand, are taken into account by the network subscribers 100. Exceptions and additions to this rule are described below.

Two variants of a method for synchronizing time in the network 1 are described in the following. These variants of the method differ in which time information is in each case used as synchronization values for synchronizing the network subscribers 100 of the different segments 10, 20, 30, 40, 50, 60.

In the first variant of the method, time information of that network distributor 201, 202, 203, 204 at which the respective segment 20, 30, 40, 50, 60 begins is used in each case for time synchronization of the network subscribers 100 of a downstream segment 20, 30, 40, 50, 60. In the exemplary network 1 shown in FIG. 1, time information of the first network distributor 201 is thus used to synchronize the network subscribers 100 of the second segment 20. In order to synchronize the network subscribers 100 of the third segment 30, time information of the third network distributor 203 is used. In order to time-synchronize the network subscribers 100 of the fourth segment 40, time information of the second network distributor 202 is used. In order to time-synchronize the network subscribers 100 of the fifth segment 50, time information of the fourth network distributor 204 is used. In order to time-synchronize the network subscribers 100 of the sixth segment 60, time information of the fourth network distributor 204 is used, as well.

The used time information of the respective network distributor 201, 202, 203, 204 may be the local system time 340 of the respective network distributor 201, 202, 203, 204. This local system time 340 may be calculated by the respective network distributor 201, 202, 203, 204, as already described, by adding its local time 310 and the time difference 320 stored in the respective network distributor 201, 202, 203, 204.

Alternatively, the time information may be an alternative local system time 350 of the respective network distributor 201, 202, 203, 204. This alternative local system time 350 may be formed by the respective network distributor 201, 202, 203, 204 from a value of the system time received during a previous synchronization process in its segment 10, 20, 30, 40, 50, 60 and a time progress of the local time 310 of the respective network distributor 201, 202, 203, 204 since the receipt of this value of the system time. In this regard, the time progress of the local time 310 since receiving the value of the system time may be determined by the respective network distributor 201, 202, 203, 204 storing the value of the local time 310 at the time of receiving the value of the system time and comparing it to the then current value of the local time 310 at the time of determining the alternative local system time 350. Alternatively, the obtained value of the system time may be stored by the respective network distributor 201, 202, 203, 204 and incremented in synchrony with the local time 310 starting from the time of obtaining this value of the system time.

In order to time-synchronize the network subscribers 100 of the first segment 10 of the network 1, the master network subscriber 99 sends out the first synchronization telegram 401 and addresses it to the first segment 10. Since the first synchronization telegram 401 is to be processed directly by the network subscribers 100 of the first segment 10, the first synchronization telegram 401 is transmitted with the second type.

A reference timer 600 of the network 1 inserts the system time of the network 1 as the first synchronization value 411 into the first synchronization telegram 401.

For example, the first network subscriber 100, 111 of the first segment 10 may act as the reference timer 600. This is shown schematically in FIG. 4 which shows a portion of network 1 according to one variant. In this case, the first synchronization telegram 401 is sent out by the master network subscriber 99 to the network subscribers 100 of the first segment 10. The first network subscriber 100, 111 of the first segment 10 acting as reference timer 600 enters its local system time 340 as the first synchronization value 411 in the first synchronization telegram 401 and then forwards the first synchronization telegram 401 to the other network subscribers 100 of the first segment 10.

Alternatively, the master network subscriber 99 of the network 1 may act as a reference timer 600. This is shown schematically in FIG. 5, which shows a portion of network 1 according to another variant. In this case, the master network subscriber 99 itself sets the system time of the network 1 as the first synchronization value 411 into the first synchronization telegram 401 and then sends out the first synchronization telegram 401 to the network subscribers 100 of the first segment 10.

The network subscribers 100 of the first segment 10 each receive the first synchronization telegram 401, read out the first synchronization value 411 from the first synchronization telegram 401 and adjust the speed of their local system time 340 using the first synchronization value 411 in each case. In each case, they take into account the delay time 330 stored in the respective network subscriber 100, which indicates how long the first synchronization telegram 401 took on its way from the reference timer 600 to the respective network subscriber 100.

In order to time-synchronize the network subscribers 100 of the second segment 20, time information of the first network distributor 201 connecting the second segment 20 to the first segment 10 is used.

The master network subscriber 99 sends out the second synchronization telegram 402 addressed to the second segment 20. Thereby the second synchronization telegram 402 is sent out with the first type.

The first network distributor 201 receives the second synchronization telegram 402 and inserts time information as a second synchronization value 412 into the second synchronization telegram 402. As described above, the time information may be the local system time 340 of the first network distributor 201 or the alternative local system time 350 of the first network distributor 201. The first network distributor 201 further converts the second synchronization telegram 402 to the second type. This may be done, as described above, by changing the value of the second type field 422 of the second synchronization telegram 402 from a first value to a second value. The first network distributor 201 subsequently forwards the second synchronization telegram 402 to the network subscribers 100 of the second segment 20 by forwarding the second synchronization telegram 402 to the first network subscriber 100, 121 of the second segment 20.

The network subscribers 100 of the second segment 20 each receive the second synchronization telegram 402, read out the second synchronization value 412 stored in the second synchronization telegram 402, and each adjust the speed of their local system time 340 using the second synchronization value 412. In doing so, the network subscribers 100 of the second segment 20 also each take into account the delay time 330 stored in the respective network subscribers 100 into account, which indicates how long the second synchronization telegram 402 takes to travel from the first network distributor 201 to the respective network subscriber 100 of the second segment 20.

For time synchronization of the network subscribers 100 of the third segment 30, time information of the third network distributor 203 connecting the third segment 30 to the second segment 20 is used.

For this purpose, the master network subscriber 99 transmits the third synchronization telegram 403. The third synchronization telegram 403 is addressed to the third segment 30. The third synchronization telegram 403 sent by the master network subscriber 99 is of the first type.

In a subsequent method step, the third synchronization telegram 403 is received by the third network distributor 203. The third network distributor 203 inserts time information of the third network distributor 203 as a third synchronization value 413 into the third synchronization telegram 403. The time information of the third network distributor 203 may in turn be the local system time 340 of the third network distributor 203 or the alternative local system time 350 of the third network distributor 203.

In addition, the third network distributor 203 converts the third synchronization telegram 403 to the second type.

Subsequently, the third network distributor 203 forwards the third synchronization telegram 403 to the network subscribers 100 of the third segment 30 by the third network distributor 203 forwarding the third synchronization telegram 403 to the first network subscriber 100, 131 of the third segment 30 via its third port 233.

The network subscribers 100 of the third segment 30 each receive the third synchronization telegram 403, read out the third synchronization value 413 stored in the third synchronization telegram 403, and each adjust the speed of their local system time 340 using the third synchronization value 413. In doing so, the network subscribers 100 of the third segment 30 also take into account the delay time 330 stored in the respective network subscribers 100, which indicates how long the third synchronization telegram 403 takes on its way from the third network distributor 203 to the respective network subscriber 100 of the third segment 30.

In order to time-synchronize the network subscribers 100 of the fourth segment 40 of the network 1, time information of the second network distributor 202 connecting the fourth segment 40 to the first segment 10 is used.

The master network subscriber 99 transmits the fourth synchronization telegram 404 for this purpose. The fourth synchronization telegram 404 is sent out with the first type and is addressed to the fourth segment 40.

The second network distributor 202 receives the fourth synchronization telegram 404 and converts the fourth synchronization telegram 404 to the second type. Furthermore, the second network distributor 202 inserts timing information of the second network distributor 202 as a fourth synchronization value 414 into the fourth synchronization telegram 404. The time information of the second network distributor 202 may again be the local system time 340 of the second network distributor 202 or the alternative local system time 350 of the second network distributor 202. Subsequently, the second network distributor 202 forwards the fourth synchronization telegram 404 to the network subscribers 100 of the fourth segment 40, with the second network distributor 202 passing the fourth synchronization telegram 404 to the first network subscriber 100, 141 of the fourth segment 40 via its third port 232.

The network subscribers 100 of the fourth segment 40 each receive the fourth synchronization telegram 404, read out the fourth synchronization value 414 stored in the fourth synchronization telegram 404 and adjust the speed of their local system time 340 using the fourth synchronization value 414, respectively. In doing so, the network subscribers 100 of the fourth segment 40 each also take into account the delay time 330 stored in the network subscribers 100, which indicates how long the fourth synchronization telegram 404 takes to travel from the second network distributor 202 to the respective network subscriber 100 of the fourth segment 40.

Time information from the fourth network distributor 204, which connects the fifth segment 50 to the fourth segment 40, is used to time-synchronize the network subscribers 100 of the fifth segment 50.

For this purpose, the master network subscriber 99 sends out the fifth synchronization telegram 405. The fifth synchronization telegram 405 has the first type and is addressed to the fifth segment 50.

The fourth network distributor 204 receives the fifth synchronization telegram 405 and converts the fifth synchronization telegram 405 to the second type. Furthermore, the fourth network distributor 204 inserts timing information of the fourth network distributor 204 as the fifth synchronization value 415 into the fifth synchronization telegram 405. The time information of the fourth network distributor 204 may be the local system time 340 of the fourth network distributor 204 or the alternative local system time 350 of the fourth network distributor 204. Subsequently, the fourth network distributor 204 forwards the fifth synchronization telegram 405 to the fifth segment 50 by the fourth network distributor 204 passing the fifth synchronization telegram 405 to the first network subscriber 100, 151 of the fifth segment 50 via its third port 234.

The network subscribers 100 of the fifth segment 50 each receive the fifth synchronization telegram 405, read out the fifth synchronization value 415 contained in the fifth synchronization telegram 405 and adjust the speed of their local system time 340 using the fifth synchronization value 415. In doing so, the network subscribers 100 of the fifth segment 50 each also take into account the delay time 330 stored in the respective network subscribers 100, which indicates how long the fifth synchronization telegram 405 takes on its way from the fourth network distributor 204 to the respective network subscriber 100 of the fifth segment 50.

Time information from the fourth network distributor 204 is used, as well, to time-synchronize the network subscribers 100 of the sixth segment 60, since the fourth network distributor 204 also connects the sixth segment 60 to the fourth segment 40.

For the purpose, the master network subscriber 99 transmits the sixth synchronization telegram 406. The sixth synchronization telegram 406 has the first type and is addressed to the sixth segment 60.

The fourth network distributor 204 receives the sixth synchronization telegram 406, converts it to the second type, and inserts a time information of the fourth network distributor 204 as the sixth synchronization value 416 into the sixth synchronization telegram 406. The time information of the fourth network distributor 204 may again be the local system time 340 of the fourth network distributor 204 or the alternative local system time 350 of the fourth network distributor 204. Subsequently, the fourth network distributor 204 forwards the sixth synchronization telegram 406 to the sixth segment 60 by passing the sixth synchronization telegram 406 to the first network subscriber 100, 161 of the sixth segment 60 via its fourth port 244.

The network subscribers 100 of the sixth segment 60 each receive the sixth synchronization telegram 406, read out the sixth synchronization value 416 stored in the sixth synchronization telegram 406, and each adjust the speed of their local system time 340 using the sixth synchronization value 416. In doing so, the network subscribers 100 of the sixth segment 60 also take into account the delay time 330 stored in the respective network subscribers 100, each of which indicates how long the sixth synchronization telegram 406 takes on its way from the fourth network distributor 204 to the respective network subscriber 100 of the sixth segment 60.

A second variant of the method for synchronizing time in the network 1 is described below. This second variant of the method for time synchronization has similarities with the first variant of the method for time synchronization described above. The description of the second variant of the method for synchronizing time therefore refers to the same figures and uses the same reference signs as the above description. The following is essentially a description of how the second variant of the method for time synchronization differs from the first variant of the method for synchronizing time described above.

Figure 4:
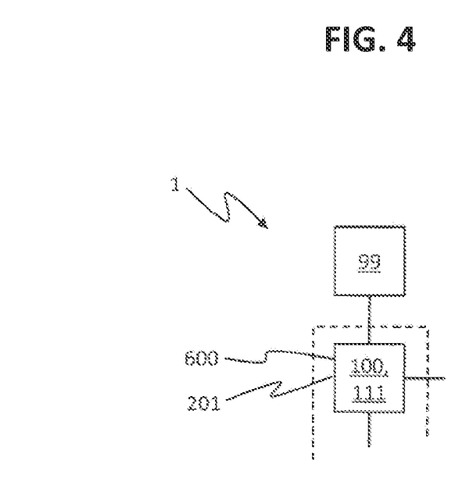
FIG. 4 shows a schematic depiction of a part of the network according to a first variant.
Figure 5:
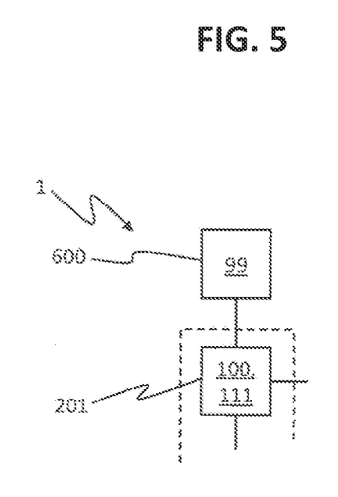
FIG. 5 is a schematic depiction of a part of the network according to a second variant.

The network subscribers 100 of the first segment 10 of the network 1 are synchronized in the second variant of the method in the same way as in the first variant of the method described above. Again, the first network subscriber 100, 111 of the first segment 10 may serve as reference timer 600, as shown in FIG. 4. Alternatively, the master network subscriber 99 of the network 1 may serve as reference timer 600, as shown in FIG. 5. In order to time-synchronize the network subscribers 100 of the first segment 10, the reference timer 600 inserts a reference time as a first synchronization value 411 into the first synchronization telegram 401 transmitted by the master network subscriber 99. If the master network subscriber 99 itself acts as the reference timer 600, the master network subscriber 99 itself inserts the reference time as the first synchronization value 411 into the first synchronization telegram 401 before sending out the first synchronization telegram 401. If the first network subscriber 100, 111 of the first segment 10 acts as the reference timer 600, the local system time 340 of the first network subscriber 100, 111 of the first segment 10 is used as the reference time. In this case, the first network subscriber 100, 111 of the first segment 10 receives the first synchronization telegram 401 sent out by the master network subscriber 99, inserts its local system time 340 as the first synchronization value 411 into the first synchronization telegram 401, and then forwards the first synchronization telegram 401 to the other network subscribers 100 of the first segment 10.

The second variant of the method for synchronizing time of the network subscribers 100 differs from the first variant of the method for time synchronization of the network subscribers 100 described above in that in the second variant of the method, the reference time provided by the reference timer 600 also forms the basis for the synchronization values 412, 413, 414, 415, 416 used for time synchronization of the network subscribers 100 of the downstream segments 20, 30, 40, 50, 60. In addition, this takes into account passage times that may occur when the synchronization telegrams 402, 403, 404, 405, 406 are forwarded to the downstream segments 20, 30, 40, 50, 60 by the network distributors 201, 202, 203, 204. These passage times are added to the synchronization values 412, 413, 414, 415, 416 stored in the synchronization telegrams 402, 403, 404, 405, 406.

In order to time-synchronize the network subscribers 100 of the second segment 20, the master network subscriber 99 transmits the second synchronization telegram 402. The second synchronization telegram 402 is transmitted with a first type. The reference timer 600 of the network 1 inserts the reference time as a second synchronization value 412 into the second synchronization telegram 402. If the master network subscriber 99 acts as the reference timer 600, the master network subscriber 99 inserts the reference time as the second synchronization value 412 into the second synchronization telegram 402 even before the second synchronization telegram 402 is sent out. If the first network subscriber 100, 111 of the first segment 10 acts as the reference timer 600 of the network 1, the first network subscriber 100, 111 of the first segment 10 receives the second synchronization telegram 402 transmitted by the master network subscriber 99 and inserts the local system time 340 of the first network subscriber 100, 111 of the first segment 10 serving as the reference time as the second synchronization value 412 into the second synchronization telegram 402.

The first network distributor 201 which connects the second segment 20 to the first segment 10 subsequently converts the second synchronization telegram 402 to the second type.

In addition, as the case may be, the first network distributor 201 increases the second synchronization value 412 stored in the second synchronization telegram 402 by a first passage time 510 required for forwarding the second synchronization telegram 402 to the network subscribers 100 of the second segment 20. This first passage time 510 is illustrated schematically in FIG. 6. The first network distributor 201 receives the second synchronization telegram 402 at a first point in time 501 via its first port 211. To forward the second synchronization telegram 402 to the network subscriber 100 of the second segment 20, the first network distributor 201 must output the second synchronization telegram 402 via its third port 231. However, it may happen that the third port 231 of the first network distributor 201 is at first still occupied and that the second synchronization telegram 402 may therefore not forwarded via the third port 231 of the first network distributor 201 until a second point in time 502 after the first passage time 510 has elapsed. This first passage time 510 is variable and does not occur every time a synchronization telegram is forwarded by the first network distributor 201 to the second segment 20. Therefore, when forwarding the second synchronization telegram 402, the first network distributor 201 determines the first passage time 510 actually required and adds it to the second synchronization value 412 stored in the second synchronization telegram 402.

In the special case that the first network distributor 201 as the first network subscriber 100, 111 of the first segment 10 also functions as the reference timer 600, the first network distributor 201 may optionally insert the reference time as the second synchronization value 412 into the second synchronization telegram 402 only after the first passage time 510 has elapsed. In this case, it is not necessary to subsequently add the first passage time 510 to the second synchronization value 412.

After the first network distributor 201 has forwarded the second synchronization telegram 402 to the network subscribers 100 of the second segment 20, the second synchronization telegram 402 is received by each of the network subscribers 100 of the second segment 20 in turn. The network subscribers 100 of the second segment 20 each read the second synchronization value 412 stored in the second synchronization telegram 402 and adjust the speed of their local system time 340 using the second synchronization value 412. In doing so, the network subscribers 100 of the second segment 20 each also take into account the delay time 330 stored in the respective network subscribers 100, which indicates how long the second synchronization telegram 402 takes from the reference timer 600 to the respective network subscriber 100 independently of the first passage time 510.

In order to time-synchronize the network subscribers 100 of the third segment 30, the master network subscriber 99 transmits the third synchronization telegram 403, the third synchronization telegram 403 having the first type. Thereby, the third synchronization telegram 403 is addressed to the third segment 30.

The reference timer 600 of the network 1 inserts the reference time as the third synchronization value 413 into the third synchronization telegram 403 in the manner described above. The first network distributor 201 forwards the third synchronization telegram 403 to the second segment 20, wherein the first network distributor 201 increases the third synchronization value 413 stored in the third synchronization telegram 403, if necessary, by the first passage time 510 required for forwarding the third synchronization telegram 403. In the special case already mentioned above that the first network distributor 201, as the first network subscriber 100, 111 of the first segment 10, also acts as the reference timer 600, the first network distributor 201 may optionally insert the reference time as the third synchronization value 413 into the third synchronization telegram 403 only after the first passage time 510 has elapsed. In this case, it is not necessary to subsequently add the first passage time 510 to the third synchronization value 413.

Subsequently, the third synchronization telegram 403 is received by the third network distributor 203 arranged in the second segment 20, which connects the third segment 30 to the second segment 20. The third network distributor 203 converts the third synchronization telegram 403 into the second type.

Figure 6:
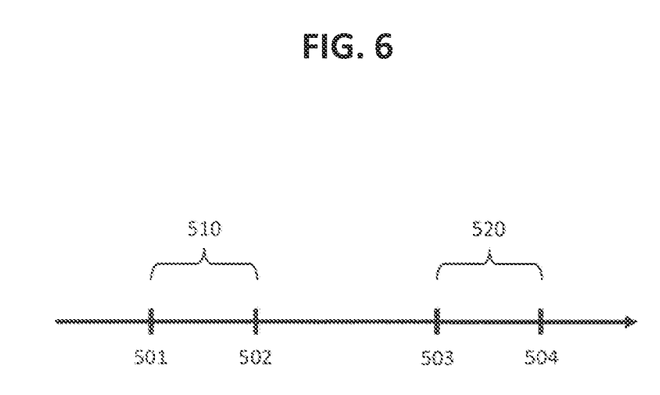
FIG. 6 shows a timeline to illustrate the passage times required to forward a synchronization telegram.

Then, the third network distributor 203 forwards the third synchronization telegram 403 to the third segment 30 via its third port 233. Here, a second passage time 520 illustrated in FIG. 6 may occur in the third network distributor 203, which the third network distributor 203 adds to the third synchronization value 413 stored in the third synchronization telegram 403 before forwarding the third synchronization telegram 403. As schematically shown in FIG. 6, the third network distributor 203 receives the third synchronization telegram 403 at a third point in time 503 via its first port 213. The third port 233 of the third network distributor 203 may at first still be occupied, so that the third network distributor 203 may not forward the third synchronization telegram 403 to the third segment 30 until after the second passage time 520 has elapsed at a fourth point in time 504. This second passage time 520 does not occur every time a synchronization telegram passes through the third network distributor 203, and is also variable. Therefore, when the third synchronization telegram 403 is forwarded, the third network distributor 203 determines the passage time that actually occurs and adds it to the synchronization value 413 stored in the third synchronization telegram 403.

After forwarding the third synchronization telegram 403 to the third segment 30, each network subscriber 100 of the third segment 30 successively receives the third synchronization telegram 403, reads out the third synchronization value 413 stored in the third synchronization telegram 403 and adjusts the speed of its local system time 340 using the third synchronization value 413, respectively. In doing so, the network subscribers 100 of the third segment 30 also take into account the delay time 330 stored in the respective network subscribers 100, which indicates how long the third synchronization telegram 403 takes from the reference timer 600 to the respective network subscriber 100 of the third segment 30, regardless of the first passage time 510 and the second passage time 520.

In order to time-synchronize the network subscribers 100 of the fourth segment 40, the master network subscriber 99 transmits the fourth synchronization telegram 404. Here, the fourth synchronization telegram 404 has the first type and is addressed to the fourth segment 40. The reference timer 600 of the network 1 inserts the reference time as the fourth synchronization value 414 into the fourth synchronization telegram 404 in the manner already described.

The fourth synchronization telegram 404 is then received by the second network distributor 202 which connects the fourth segment 40 to the first segment 10. The second network distributor 202 converts the fourth synchronization telegram 404 to the second type.

Subsequently, the second network distributor 202 forwards the fourth synchronization telegram 404 via its third port 232. However, since the third port 232 may at first still be occupied, the variable first passage time 510 described above with reference to FIG. 6 may again occur before the fourth synchronization telegram 404 is forwarded to the fourth segment 40, which variable first passage time 510 the second network distributor 202 adds to the fourth synchronization value 414 stored in the fourth synchronization telegram 404 before forwarding the fourth synchronization telegram 404.

After forwarding the fourth synchronization telegram 404 to the fourth segment 40, each network subscriber 100 of the fourth segment 40 receives the fourth synchronization telegram 404, reads out the fourth synchronization value 414 stored in the fourth synchronization telegram 404, and adjusts the speed of its local system time 340 using the fourth synchronization value 414, respectively. In doing so, the network subscribers 100 of the fourth segment 40 each also take into account the delay time 330 stored in the respective network subscriber 100, which indicates how long the fourth synchronization telegram 404 takes in addition to the first passage time 510 from the reference timer 600 to the respective network subscriber 100 of the fourth segment 40.

In order to time-synchronize the network subscribers 100 of the fifth segment 50, the master network subscriber 99 sends out the fifth synchronization telegram 405. The fifth synchronization telegram 405 is transmitted with the first type and is addressed to the fifth segment 50. The reference timer 600 inserts the reference time as the fifth synchronization value 415 into the fifth synchronization telegram 405 in the manner already described.

The fifth synchronization telegram 405 is received by the second network distributor 202, which connects the fourth segment 40 to the first segment 10. The second network distributor 202 forwards the fifth synchronization telegram 405 to the fourth segment 40 via its third port 232 and previously increases the fifth synchronization value 415 stored in the fifth synchronization telegram 405 by the variable first passage time 510 required for forwarding the fifth synchronization telegram 405.

In the fourth segment 40, the fifth synchronization telegram 405 is received by the fourth network distributor 204, which connects the fifth segment 50 to the fourth segment 40. The fourth network distributor 204 converts the fifth synchronization telegram 405 into the second type.

The fourth network distributor 204 then forwards the fifth synchronization telegram 405 to the fifth segment 50 via its third port 234. Since the third port 234 of the fourth network distributor 204 may at first still be occupied, however, the variable second passage time 520 already described above with reference to FIG. 6 may occur here, which the fourth network distributor 204 adds to the fifth synchronization value 415 stored in the fifth synchronization telegram 405 before forwarding the fifth synchronization telegram 405 to the fifth segment 50.

After forwarding the fifth synchronization telegram 405 to the fifth segment 50, the network subscribers 100 of the fifth segment 50 each receive the fifth synchronization telegram 405, read out the fifth synchronization value 415 stored in the fifth synchronization telegram 405 and each adjust the speed of their local system time 340 using the fifth synchronization value 415. In doing so, the network subscribers 100 of the fifth segment 50 each also take into account the delay time 330 stored in the respective network subscriber 100, which in each case indicates how long the fifth synchronization telegram 405 requires on its way from the reference timer 600 to the respective network subscriber 100 of the fifth segment 50, irrespective of the first passage time 510 and the second passage time 520.

In order to time-synchronize the network subscribers 100 of the sixth segment 60, the master network subscriber 99 sends out the sixth synchronization telegram 406. The sixth synchronization telegram 406 is transmitted with the first type and is addressed to the sixth segment 60. The reference timer 600 of the network 1 inserts the reference time as the sixth synchronization value 416 into the sixth synchronization telegram 406 in the manner already described.

The second network distributor 202 which connects the fourth segment 40 to the first segment 10 receives the sixth synchronization telegram 406 and forwards it to the fourth segment 40 via its third port 232. Prior thereto, the second network distributor 202 adds the variable first passage time 510 required for this to the sixth synchronization value 416 stored in the sixth synchronization telegram 406.

In the fourth segment 40, the fourth network distributor 204 which connects the sixth segment 60 to the fourth segment 40 receives the sixth synchronization telegram 406. The fourth network distributor 204 converts the sixth synchronization telegram 406 to the second type and forwards the sixth synchronization telegram 406 to the sixth segment 60 via its fourth port 244. Prior to this, the fourth network distributor 204 adds the variable second passage time 520 required for forwarding the sixth synchronization telegram 406 to the sixth synchronization value 416 stored in the sixth synchronization telegram 406.

Subsequently, the network subscribers 100 of the sixth segment 60 each receive the sixth synchronization telegram 406, read out the sixth synchronization value 416 stored in the sixth synchronization telegram 406 and each adjust the speed of their local system time 340 using the sixth synchronization value 416. In doing so, the network subscribers 100 of the sixth segment 60 each also take into account the delay time 330 stored in the respective network subscriber 100, which indicates how long the sixth synchronization telegram 406 takes to travel from the reference timer 600 to the respective network subscriber 100 of the sixth segment 60 in addition to the first passage time 510 and the second passage time 520.

The above-described second variant of the method for synchronizing time in the network 1, in which the reference time provided by the reference timer 600 also forms the basis for the synchronization values 412, 413, 414, 415, 416 used for time synchronization of the network subscribers 100 of the downstream segments 20, 30, 40, 50, 60, may also be carried out in a simplified form, which is described below.

In this simplified form, the master network subscriber 99 does not send out the second synchronization telegram 402, the third synchronization telegram 403, the fourth synchronization telegram 404, the fifth synchronization telegram 405 and the sixth synchronization telegram 406 with the first type, but with the second type. If the type of the synchronization telegrams 402, 403, 404, 405, 406 is determined in each case by the value of the respective type field 422, this may mean that the second synchronization telegram 402, the third synchronization telegram 403, the fourth synchronization telegram 404, the fifth synchronization telegram 405 and the sixth synchronization telegram 406 are transmitted with the second value in the type field 422, by the master network subscriber 99.

In this simplified form of the method, the type of the synchronization telegrams 402, 403, 404, 405, 406 is accordingly not converted by the network distributors 201, 202, 203, 204, either, which connect the respective segments 20, 30, 40, 50 to be synchronized. The first network distributor 201 which connects the second segment 20 to the first segment 10 thus does not convert the second synchronization telegram 402 into the second type. The third network distributor 203 does not convert the third synchronization telegram 403 into the second type. The second network distributor 202 does not convert the fourth synchronization telegram 404 into the second type. The fourth network distributor 204 does not convert the fifth synchronization telegram 405 or the sixth synchronization telegram 406 into the second type.

In this simplified form of the method for time synchronization in the network 1, the synchronization telegrams 402, 403, 404, 405, 406 may pass through more network subscribers 100 of the network 1 than in the variant described above, in which the master network subscriber 99 sends out the second synchronization telegram 402, the third synchronization telegram 403, the fourth synchronization telegram 404, the fifth synchronization telegram 405 and the sixth synchronization telegram 406 is transmitted with the first type and the type is then converted by the network distributors 201, 202, 203, 204. However, this does not represent a significant disadvantage.

The described variants of the method for time-synchronizing the network subscribers 100 of the network 1 may each be repeated cyclically.

With reference to FIG. 2, it has already been described that each network subscriber 100 of network 1 knows a delay time 330 stored in the respective network subscriber 100. The delay time 330 indicates the time required for a telegram, e.g. a synchronization telegram, to reach the respective network subscriber 100 from the reference timer 600 of the network 1. This delay time 330 is determined during an initialization phase of the network 1 for each network subscriber 100 by the master network subscriber 99, and stored in the respective network subscriber 100.

For this purpose, the master network subscriber 99 sends a telegram in which all network subscribers 100 enter the receipt time on the outward path and on the return path. The master network subscriber 99 reads out these receipt times and may use them to determine the passage times between the network subscribers 100. From this, the respective delay time 330 may then be calculated for each network subscriber 100. Since the described passage times 510, 520 may also occur in the network distributors 201, 202, 203, 204, these are also recorded and taken into account when determining the delay times 330.

The network 1 shown in FIG. 1 is selected merely as an example. The described method for time synchronization of the network subscribers 100 may also be used in a differently structured network with a different number of segments and a different arrangement of the segments.

According to one aspect of the invention, a method is provided for synchronizing time in an Ethernet-based network having a master network subscriber, a first segment and a second segment. Each segment comprises at least one network subscriber, where the second segment is connected to the first segment by a first network distributor arranged in the first segment. The method comprises steps for sending out a synchronization telegram addressed to the second segment via the master network subscriber, the synchronization telegram being of the first type; for receiving the synchronization telegram via the first network distributor, for converting the synchronization telegram into a second type via the first network distributor, for forwarding the synchronization telegram to a network subscriber of the second segment via the first network distributor, for reading out a synchronization value stored in the synchronization telegram by the network subscriber of the second segment, and for adjusting a speed of a local system time of the network subscribers of the second segment, using the synchronization value.

Advantageously, this method allows for time synchronization to be performed in an Ethernet-based network having a plurality of segments in which not all telegrams always pass through all network subscribers of all segments. This is made possible by the present method in that the master network subscriber sends out the synchronization telegram explicitly addressed to the second segment for time synchronization of the network subscribers of the second segment. By sending out the synchronization telegram of the first type and by having it converted into the second type only by the first network distributor, it may advantageously be ensured that uninvolved network subscribers of the Ethernet-based network do not pay attention to the synchronization telegram.

By the network subscriber of the second segment using the synchronization value communicated to it with the synchronization telegram to adjust the speed of its local system time, it may advantageously be achieved that the local system time of the network subscriber of the second segment remains synchronous with the system time of the remaining network. This correspondingly applies to any other network subscribers of the second segment, as well.

Accordingly, the method may also be carried out for further segments of the network that are connected to the first segment via network distributors arranged in the first segment.

In an embodiment of the method, the network has a third segment which is connected to the second segment via a second network distributor arranged in the second segment. In this context, the method comprises further steps for sending a further synchronization telegram addressed to the third segment by the master network subscriber, the further synchronization telegram being of the first type, for receiving the further synchronization telegram by the second network distributor, for converting the further synchronization telegram into the second type by the second network distributor, for forwarding the further synchronization telegram to a network subscriber of the third segment by the second network distributor, for reading out a further synchronization value stored in the further synchronization telegram by the network subscriber of the third segment, and for adjusting a speed of a local system time of the network subscriber of the third segment using the further synchronization value.

Advantageously, this method also enables time synchronization of the network subscribers of the network arranged in the third segment and correspondingly also time synchronization of network subscribers arranged in other segments of the network subordinate to the second or other segments. The method allows for this due to the master network subscriber sending out the further synchronization telegram explicitly addressed to the third segment. The network subscriber of the third segment uses the further synchronization value communicated with this further synchronization telegram to adjust the speed of its local system time. Any further network subscribers of the third segment proceed in the same way. This ensures that the local system time of the network subscriber of the third segment and any further network subscribers of the third segment remains synchronous with the system time of the rest of the network.

Due to the master network subscriber sending out the further synchronization telegram of the first type and only the second network distributor converting the additional synchronization telegram into the second type, it may be achieved that the network subscribers of the network to which the additional synchronization telegram is not directed do not pay attention to the additional synchronization telegram. The conversion of the further synchronization telegram into the second type by the second network distributor ensures that the network subscribers of the third segment take the further synchronization telegram into account.

In an embodiment of the method, after the synchronization telegram has been received by the first network distributor, a further step is performed for inserting a time information of the first network distributor as a synchronization value into the synchronization telegram by the first network distributor. In this variant of the method, the time information of the first network distributor is thus used as a synchronization value for synchronizing time of the network subscribers of the second segment of the network. Accordingly, time information of the network distributor via which the respective segment is connected to the first segment is used in each case for synchronizing time of network subscribers of the network that are arranged in other segments of the network connected to the first segment.

In another embodiment of the method, the time information of the first network distributor results from a local time of the first network distributor and a time difference stored in the first network distributor. The time difference stored in the first network distributor may thereby indicate by which value the local time of the first network distributor differs from a reference time of the first segment of the network. A speed of the local time of the first network distributor may itself be subject to cyclic time synchronization.

In another embodiment of the method, the time information of the first network distributor results from a value of the system time of the first segment obtained during a previous synchronization process and a time progress of a local time of the first network distributor since the value of the system time of the first segment was obtained. Advantageously, the time information of the first network distributor may in this variant correspond even more to the system time of the first segment.

In an embodiment of the method, said method comprises a further step for inserting time information of the second network distributor as a further synchronization value into the further synchronization telegram by the second network distributor. Advantageously, this ensures that the network subscribers arranged in the third segment of the network use the time information of the second network distributor for time synchronization. The time information of the second network distributor may be formed analogously to the time information of the first network distributor.

In an alternative embodiment of the method, before the synchronization telegram is received by the first network distributor, a further step is carried out for inserting a reference time as a synchronization value into the synchronization telegram by a reference timer. After the synchronization telegram has been received by the first network distributor, a further step is performed for increasing the synchronization value stored in the synchronization telegram by a first passage time through the first network distributor required for forwarding the synchronization telegram by the first network distributor. In this embodiment of the method, the reference time inserted as a synchronization value into the synchronization telegram by the reference timer is used for the time synchronization of the network subscriber of the second segment. Advantageously, it is ensured that a first passage time required for forwarding the synchronization telegram by the first network distributor is taken into account in the time synchronization of the network subscriber of the second segment. This is achieved by the first network distributor adding the first passage time to the synchronization value stored in the synchronization telegram.

In another embodiment of the method, a network subscriber of the first segment acts as the reference timer. In this case, inserting the reference time into the synchronization telegram comprises steps for receiving the synchronization telegram by the reference timer, for inserting a local system time of the reference timer as the reference time into the synchronization telegram by the reference timer, and for forwarding the synchronization telegram by the reference timer. In this embodiment of the method, e.g. the first network subscriber of the first segment may serve as the reference timer. Advantageously, the method as a result requires only minor changes compared to a time synchronization method according to the prior art.

In another embodiment of the method, the master network subscriber serves as a reference timer. In this case, the master network subscriber inserts the reference time into the synchronization telegram before the synchronization telegram is sent out. Advantageously, this variant was already possible with a time synchronization from to the prior art.

In an embodiment of the method, further steps are performed prior to the second network distributor receiving the further synchronization telegram for inserting a reference time as a further synchronization value into the further synchronization telegram by the reference timer, for receiving the further synchronization telegram by the first network distributor and for forwarding the further synchronization telegram by the first network distributor. After receipt of the further synchronization telegram by the second network distributor, a further step is carried out for increasing, by the second network distributor, the further synchronization value stored in the further synchronization telegram by a second passage time required for forwarding the further synchronization telegram by the second network distributor. Advantageously, these method steps ensure that the first passage time and second passage time required for forwarding the further synchronization telegram by the first network distributor and the second network distributor are taken into account during the time synchronization of the network subscriber of the third segment by the further synchronization value contained in the further synchronization telegram.

In another embodiment of the method, the synchronization telegram has a type field. The conversion of the synchronization telegram from the first type into the second type comprises a replacement of a first value of the type field by a second value. Advantageously, this provides a simple possibility of defining and changing the type of the synchronization telegram. The type of the further synchronization telegram may be defined accordingly by a type field of the further synchronization telegram.

In another embodiment of the method, the network is an EtherCAT network. In this case, the synchronization telegram and the further synchronization telegram may be embodied as EtherCAT telegrams.

The invention claimed is:

1. A method for synchronizing time in an Ethernet-based network,
    wherein the network comprises a master network subscriber, a first segment and a second segment,
    wherein each segment comprises at least one network subscriber, and
    wherein the second segment is connected to the first segment via a first network distributor arranged in the first segment;
    wherein the method comprises the following steps:
        sending out a synchronization telegram addressed to the second segment by the master network subscriber, the synchronization telegram being of a first type;
        receiving the synchronization telegram by the first network distributor;
        converting the synchronization telegram into a second type by the first network distributor;
        forwarding the synchronization telegram to a network distributor of the second segment by the first network distributor;
        reading out a synchronization value stored in the synchronization telegram by the network subscriber of the second segment; and
        adjusting a speed of a local system time of the network subscriber of the second segment by using the synchronization value.

2. The method according to claim 1,
    wherein the network comprises a third segment, and
    wherein the third segment is connected to the second segment via a second network distributor arranged in the second segment;
    wherein the method comprises the following further steps:
        sending out a further synchronization telegram addressed to the third segment by the master network subscriber, wherein the further synchronization telegram is of the first type;
        receiving the further synchronization telegram by the second network distributor;
        converting the further synchronization telegram into the second type by the second network distributor;
        forwarding the further synchronization telegram to a network subscriber of the third segment by the second network distributor;
        reading out a further synchronization value stored in the further synchronization telegram by the network subscriber of the third segment; and
        adjusting a speed of a local system time of the network subscriber of the third segment by using the further synchronization value.

3. The method according to claim 2, wherein the method comprises the following further step:
    inserting a time information of the second network distributor into the further synchronization telegram as a further synchronization value by the second network distributor.

4. The method according to claim 2, wherein prior to receiving the synchronization telegram by the first network distributor the following further step is carried out:
    inserting a reference time into the synchronization telegram as a synchronization value by a reference timer; and
    wherein after receiving the synchronization telegram by the first network distributor, the following further step is carried out:
    incrementing, by the first network distributor, the synchronization value stored in the synchronization telegram by a first passage time required for forwarding the synchronization telegram by the first network distributor; and
    wherein prior to receiving the further synchronization telegram by the second network distributor, the following further steps are carried out:
    inserting a further reference time into the further synchronization telegram as a further synchronization value by the reference timer;
    receiving the further synchronization telegram by the first network distributor;
    incrementing, by the first network distributor, the further synchronization value stored in the further synchronization telegram by the first passage time required for forwarding the further synchronization telegram by the first network distributor; and
    forwarding the further synchronization telegram by the first network distributor; and
    wherein after receiving the further synchronization telegram by the second network distributor, the following further step is carried out:
    incrementing, by the second network distributor, the further synchronization value stored in the further synchronization telegram by a passage time required for forwarding the further synchronization telegram by the second network distributor.

5. The method according to claim 1, wherein after receiving the synchronization telegram by the first network distributor, the following further step is carried out:

inserting a time information of the first network distributor into the synchronization telegram as a synchronization value by the first network distributor.

6. The method according to claim 5, wherein the time information of the first network distributor is formed from a local time of the first network distributor and a time difference stored in the first network distributor.

7. The method according to claim 5, wherein the time information of the first network distributor is formed from a value of the system time of the first segment obtained during a previous synchronization process and a time progress of a local time of the first network distributor since obtaining the value of the system time of the first segment.

8. The method according to claim 1,
wherein prior to receiving the synchronization telegram by the first network distributor the following further step is carried out:
inserting a reference time into the synchronization telegram as a synchronization value by a reference timer; and
wherein after receiving the synchronization telegram by the first network distributor, the following further step is carried out:
incrementing, by the first network distributor, the synchronization value stored in the synchronization telegram by a first passage time required for forwarding the synchronization telegram by the first network distributor.

9. The method according to claim 8,
wherein a network subscriber of the first segment acts as the reference timer, and
wherein inserting the reference time into the synchronization telegram comprises the following steps:
receiving the synchronization telegram by the reference timer;
inserting a local system time of the reference timer into the synchronization telegram as the reference time by the reference timer; and
forwarding the synchronization telegram by the reference timer.

10. The method according to claim 8,
wherein the master network subscriber acts as the reference timer, and
wherein the master network subscriber inserts the reference time into the synchronization telegram prior to sending out the synchronization telegram.

11. The method according to claim 1,
wherein the synchronization telegram comprises a type field, and
wherein converting the synchronization telegram from a first type to a second type comprises replacing a first value of the type field by a second value.

12. The method according to claim 1, wherein the network is an EtherCAT network.

13. A method for synchronizing time in an Ethernet-based network,
wherein the network comprises a master network subscriber, a first segment and a second segment,
wherein each segment comprises at least one network subscriber, and
wherein the second segment is connected to the first segment via a first network distributor arranged in the first segment; and
wherein the method comprises the following steps:
sending out a synchronization telegram addressed to the second segment by the master network subscriber, the synchronization telegram being of a first type, wherein the network subscribers are configured in such a way that they do not take the synchronization telegrams into account if these are of the first type;
receiving the synchronization telegram by the first network distributor;
converting the synchronization telegram into a second type by the first network distributor, wherein the network subscribers are configured in such a way that they take synchronization telegrams into account if these are of the second type;
forwarding the synchronization telegram to a network distributor of the second segment by the first network distributor;
reading out a synchronization value stored in the synchronization telegram by the network subscriber of the second segment;
adjusting a speed of a local system time of the network subscriber of the second segment by using the synchronization value.

* * * * *